United States Patent
Divakaran et al.

(10) Patent No.: US 6,823,011 B2
(45) Date of Patent: Nov. 23, 2004

(54) UNUSUAL EVENT DETECTION USING MOTION ACTIVITY DESCRIPTORS

(75) Inventors: Ajay Divakaran, Denville, NJ (US); Regunathan Radhakrishnan, Ozone Park, NY (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 569 days.

(21) Appl. No.: 09/997,497

(22) Filed: Nov. 19, 2001

(65) Prior Publication Data

US 2003/0095602 A1 May 22, 2003

(51) Int. Cl.$^7$ ................................ H04N 7/12
(52) U.S. Cl. ................................ 375/240.16
(58) Field of Search ............... 375/16, 28, 8, 375/11, 23, 4, 18; 382/236, 239, 245, 246; H04N 7/12

(56) References Cited

U.S. PATENT DOCUMENTS

| | | | | | |
|---|---|---|---|---|---|
| 5,495,555 | A | * | 2/1996 | Swaminathan | 704/207 |
| 5,847,776 | A | * | 12/1998 | Khmelnitsky et al. | 348/699 |
| 6,483,944 | B1 | * | 11/2002 | Sugahara et al. | 382/232 |
| 6,507,618 | B1 | * | 1/2003 | Wee et al. | 375/240.16 |
| 6,553,150 | B1 | * | 4/2003 | Wee et al. | 382/243 |
| 6,618,507 | B1 | * | 9/2003 | Divakaran et al. | 382/236 |

* cited by examiner

Primary Examiner—Nhon Diep
(74) Attorney, Agent, or Firm—Dirk Brinkman; Andrew J. Curtin

(57) ABSTRACT

A method detects an unusual event in a video. Motion vectors are extracted from each frame in a video acquired by a camera of a scene. Zero run-length parameters are determined for each frame from the motion vectors. The zero run-length parameters are summed over predetermined time intervals of the video, and a distance is determined between the sum of the zero run-lengths of a current time interval and the sum of the zero run-lengths of a previous time interval. Then, the unusual event is detected if the distance is greater than a predetermined threshold.

13 Claims, 4 Drawing Sheets

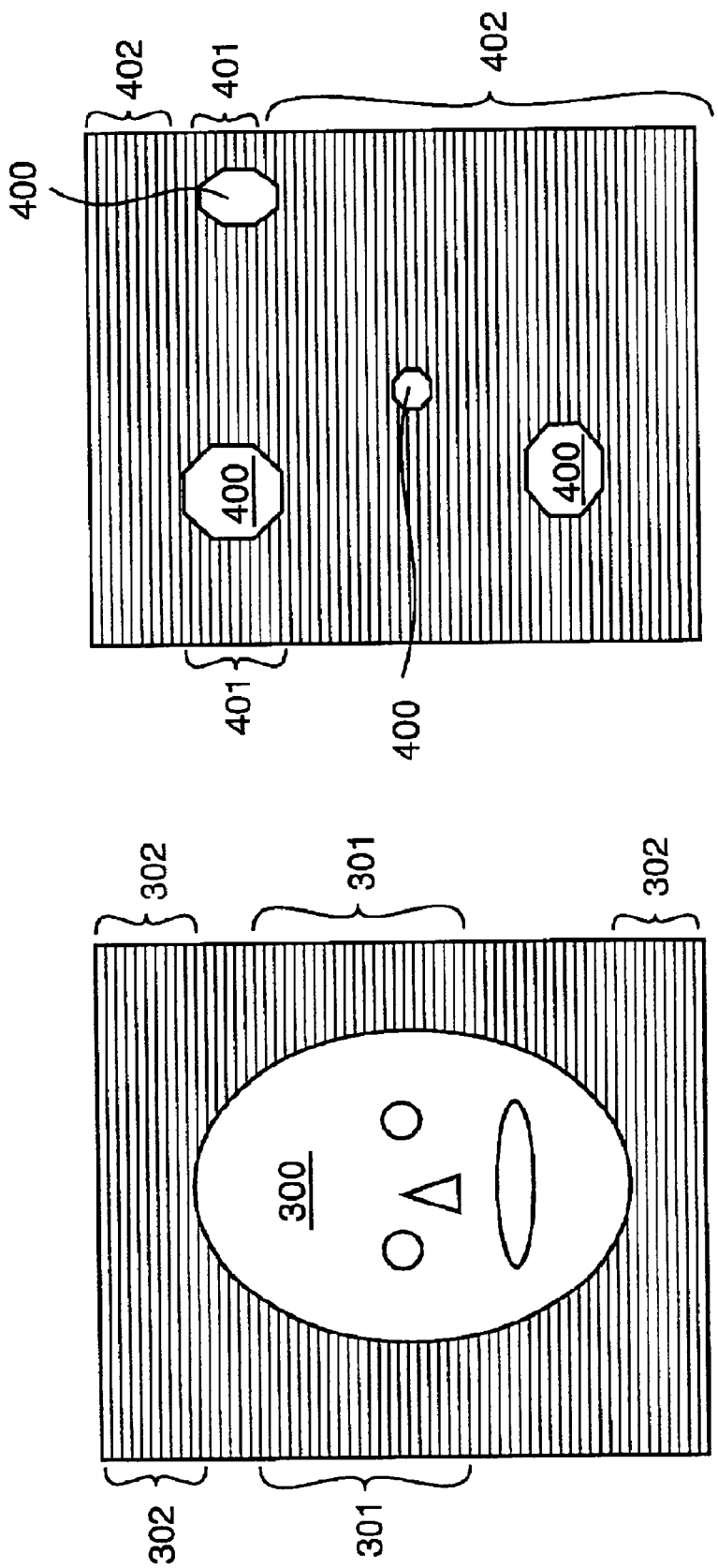

UNUSUAL EVENT DETECTION USING MOTION ACTIVITY DESCRIPTORS

FIELD OF THE INVENTION

The present invention relates generally to extracting motion vectors from a sequence of video frames, and more particularly, to detecting unusual events in videos.

BACKGROUND OF THE INVENTION

Compressed Video Formats

Basic standards for compressing the bandwidth of digital color video signals have been adopted by the Motion Picture Experts Group (MPEG). The MPEG standards achieve high data compression rates by developing information for a full frame of the image only every so often. The full image frames, i.e. intra-coded frames, are often referred to as "I-frames" or "anchor frames," and contain full frame information independent of any other frames. Image difference frames, i.e. inter-coded frames, are often referred to as "B-frames" and "P-frames," or as "predictive frames," and are encoded between the I-frames and reflect only image differences i.e. residues, with respect to the reference frame.

Typically, each frame of a video sequence is partitioned into smaller blocks of picture element, i.e. pixel, data. Each block is subjected to a discrete cosine transformation (DCT) function to convert the statistically dependent spatial domain pixels into independent frequency domain DCT coefficients. Respective 8×8 or 16×16 blocks of pixels, referred to as "macro-blocks," are subjected to the DCT function to provide the coded signal.

The DCT coefficients are usually energy concentrated so that only a few of the coefficients in a macro-block contain the main part of the picture information. For example, if a macro-block contains an edge boundary of an object, the energy in that block after transformation, i.e., as represented by the DCT coefficients, includes a relatively large DC coefficient and randomly distributed AC coefficients throughout the matrix of coefficients.

A non-edge macro-block, on the other hand, is usually characterized by a similarly large DC coefficient and a few adjacent AC coefficients which are substantially larger than other coefficients associated with that block. The DCT coefficients are typically subjected to adaptive quantization, and then are run-length and variable-length encoded for the transmission medium. Thus, the macro-blocks of transmitted data typically include fewer than an 8×8 matrix of codewords.

The macro-blocks of inter-coded frame data, i.e. encoded P or B frame data, include DCT coefficients which represent only the differences between a predicted pixels and the actual pixels in the macro-block. Macro-blocks of intra-coded and inter-coded frame data also include information such as the level of quantization employed, a macro-block address or location indicator, and a macro-block type. The latter information is often referred to as "header" or "overhead" information.

Each P frame is predicted from the lastmost occurring I or P frame. Each B frame is predicted from an I or P frame between which it is disposed. The predictive coding process involves generating displacement vectors, often referred to as "motion vectors," which indicate the magnitude of the displacement to the macro-block of an I frame most closely matches the macro-block of the B or P frame currently being coded. The pixel data of the matched block in the I frame is subtracted, on a pixel-by-pixel basis, from the block of the P or B frame being encoded, to develop the residues. The transformed residues and the vectors form part of the encoded data for the P and B frames.

Older video standards, such as ISO MPEG-1 and MPEG-2, are relatively low-level specifications primarily dealing with temporal and spatial compression of video signals. With these standards, one can achieve high compression ratios over a wide range of applications. Newer video coding standards, such as MPEG-4, see "Information Technology—Generic coding of audio/visual objects," ISO/IEC FDIS 14496-2 (MPEG4 Visual), November 1998, allow arbitrary-shaped objects to be encoded and decoded as separate video object planes (VOP). These emerging standards are intended to enable multimedia applications, such as interactive video, where natural and synthetic materials are integrated, and where access is universal. For example, one might want to extract features from a particular type of video object, or to perform for a particular class of video objects.

With the advent of new digital video services, such as video distribution on the INTERNET, there is an increasing need for signal processing techniques for identifying information in video sequences, either at the frame or object level, for example, identification of activity.

Feature Extraction

Previous work in feature extraction for video indexing from compressed data has primarily emphasized DC coefficient extraction. In a paper entitled "Rapid Scene Analysis on Compressed Video," IEEE Transactions on Circuits and Systems for Video Technology, Vol. 5, No. 6, December 1995, page 533–544, Yeo and Liu describe an approach to scene change detection in the MPEG-2 compressed video domain. The authors also review earlier efforts at detecting scene changes based on sequences of entire uncompressed image data, and various compressed video processing techniques of others. Yeo and Liu introduced the use of spatially reduced versions of the original images, so-called DC images, and DC sequences extracted from compressed video to facilitate scene analysis operations. Their "DC image" is made up of pixels which are the average value of the pixels in a block of the original image and the DC sequence is the combination of the reduced number of pixels of the DC image. It should be noted that the DC image extraction based technique is good for I-frames since the extraction of the DC values from I-frames is relatively simple. However, for other type frames, additional computation is needed.

Won et al, in a paper published in Proc. SPIE Conf. on Storage and Retrieval for Image and Video Databases, January 1998, describe a method of extracting features from compressed MPEG-2 video by making use of the bits expended on the DC coefficients to locate edges in the frames. However, their work is limited to I-frames only.

Kobla et al describe a method in the same Proceedings using the DC image extraction of Yeo et al to form video trails that characterize the video clips.

Feng et al. (IEEE International Conference on Image Processing, Vol. II, pp. 821–824, Sep. 16–19, 1996), use the bit allocation across the macro-blocks of MPEG-2 frames to detect abrupt scene changes, without extracting DC images. Feng et al.'s technique is computationally the simplest since it does not require significant computation beyond that required for parsing the compressed bit-stream.

U.S. patent Applications entitled "Methods of scene change detection and fade detection for indexing of video sequences," (application Ser. No. 09/231,698, filed Jan. 14, 1999), "Methods of scene fade detection for indexing of video sequences," (application Ser. No. 09/231,699, filed Jan. 14, 1999), "Methods of Feature Extraction for Video Sequences," (application Ser. No. 09/236,838, Jan. 25, 1999), describe computationally simple techniques which build on certain aspects of Feng et al.'s approach and Yeo et al's approach to give accurate and simple scene change detection.

After a suspected scene or object change has been accurately located in a group of consecutive frames by use of a DC image extraction based technique, application of an appropriate bit allocation-based technique and/or an appropriate DC residual coefficient processing technique to P or B-frame information in the vicinity of the located scene quickly and accurately locates the cut point. This combined method is applicable to either MPEG-2 frame sequences or MPEG-4 multiple object sequences. In the MPEG-4 case, it is advantageous to use a weighted sum of the change in each object of the frame, using the area of each object as the weighting factor.

U.S. patent application Ser. No. 09/345,452 entitled "Compressed Bit-Stream Segment Identification and Descriptor," filed by Divakaran et al. on Jul 1, 1999 describes a technique where magnitudes of displacements of inter-coded frames are determined based on the number bits in the compressed bit-stream associated with the inter-coded frames. The inter-coded frame includes macro-blocks. Each macro-block is associated with a respective portion of the inter-coded frame bits which represent the displacement from that macro-block to the closest matching intra-coded frame. The displacement magnitude is an average of the displacement magnitudes of all the macro-blocks associated with the inter-coded frame. The displacement magnitudes of those macro-blocks which are less than the average displacement magnitude are set to zero. The number of run-lengths of zero magnitude displacement macro-blocks is determined to identify the first inter-coded frame.

Activity

Work done so far has focussed on extraction of motion information, and using the motion information for low level applications such as detecting scene changes. There still is a need to extract features for higher level applications. For example, there is a need to extract features that are indicative of the nature of the activity and unusual events in a video sequence. A video or animation sequence can be perceived as being a slow sequence, a fast paced sequence, an action sequence, and so forth.

Examples of high activity include scenes such as goal scoring in a soccer match, scoring in a basketball game, a high speed car chase. On the other hand, scenes such as news reader shot, an interview scene, or a still shot are perceived as low action shots. A still shot is one where there is little change in the activity frame-to-frame. Video content in general spans the gamut from high to low activity. It would also be useful to be able to identify unusual events in a video related to observed activities. The unusual event could be a sudden increase or decrease in activity, or other temporal variations in activity depending on the application.

SUMMARY OF THE INVENTION

A method and system detect an unusual event in a video. Motion vectors are extracted from each frame in a video acquired by a camera of a scene. Zero run-length parameters are determined for each frame from the motion vectors. The zero run-length parameters are summed over predetermined time intervals of the video, and a distance is determined between the sum of the zero run-lengths of a current time interval and the sum of the zero run-lengths of a previous time interval. Then, the unusual event is detected if the distance is greater than a predetermined threshold.

The zero run-length parameters can be classified into short, medium and long zero run-lengths, and the zero run-length parameters are normalized with respect to a width of each frame of the video so that the zero run-length parameters express the number, size, and shape of distinct moving objects in the video.

BRIEF DESCRIPTION OF THE DRAWINGS

FIG. 3 is diagram of a frame of sparse activity in a video;

FIG. 4 is diagram of a frame of a dense activity in a video; and

DETAILED DESCRIPTION OF THE PREFERRED EMBODIMENT

Activity Descriptor

Figure 1:
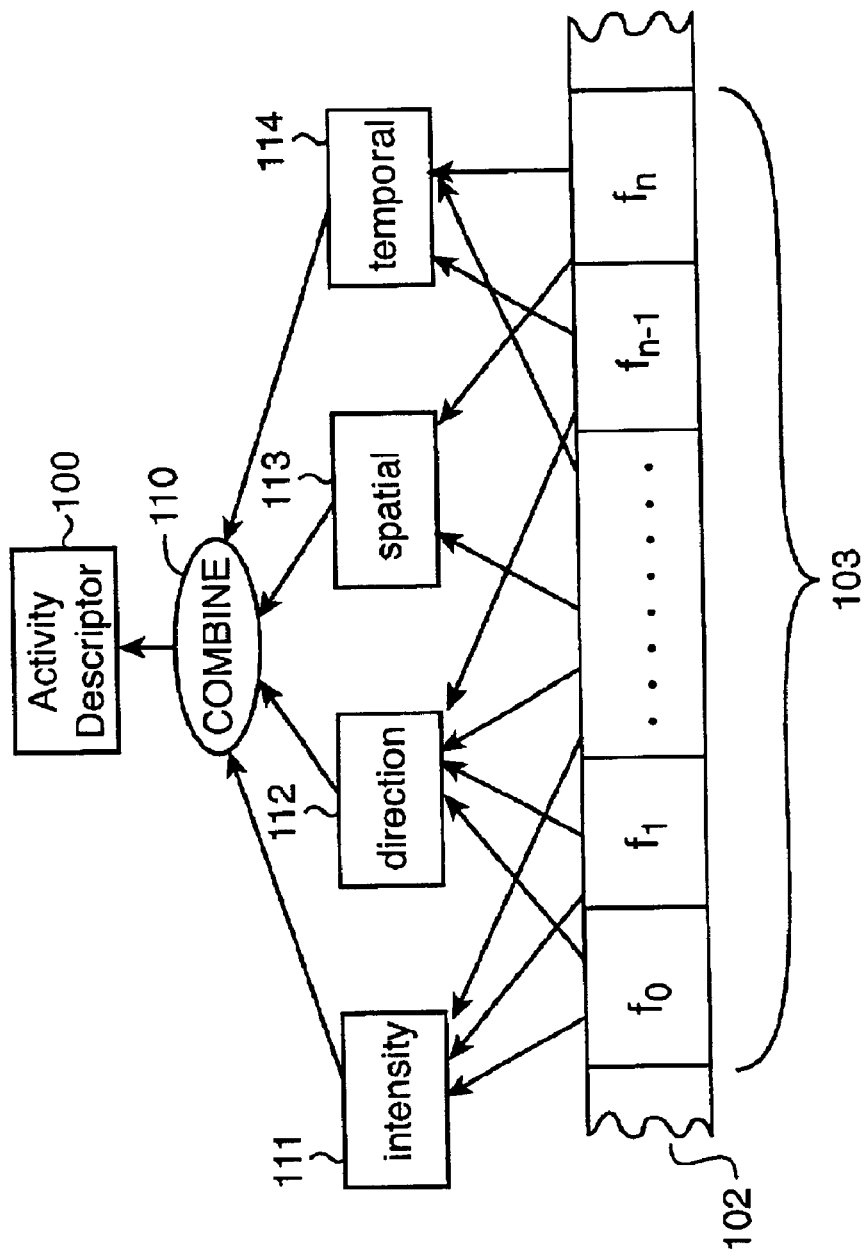
FIG. 1 is a block diagram of an activity descriptor according to the invention.

FIG. 1 shows an activity descriptor 100 that is used to detect unusual events in a video 102, according to the invention. The video 102 includes sequences of frames $(f_0, \ldots, f_n)$ that form "shots" 103. Hereinafter, a shot or a segment of the video means a set of frames that have some cohesiveness, for example, all frames taken between a lens opening and closing. The invention analyses spatial, temporal, directional, and intensity information in the video 102.

The spatial information expresses the size and number of moving regions in the shot on a frame by frame basis. The spatial information distinguishes between "sparse" shots with a small number of large moving regions, for example, a "talking head," and a "dense" shot with many small moving regions, for example, a football game. Therefore, a sparse level of activity shot is said to have a small number of large moving regions. and a dense level of activity shot is said to have a large number of small moving regions.

The distribution of the temporal information expresses the duration of each level of activity in the shot. The temporal information is an extension of the intensity of motion activity in a temporal dimension. The direction information expresses the dominant direction of the motion in a set of eight equally spaced directions. The direction information can be extracted from the average angle (direction) of the motion vectors in the video.

Therefore, the activity descriptor 100 combines 110 intensity 111, direction 112, spatial 113, and temporal 114 attributes of the level of activity in the video sequence 102.

Motion Vector Magnitude

The parameters for activity descriptor 100 are derived from the magnitude of video motion vectors as follows. For object or frame an "activity matrix" $C_{mv}$ is defined as:

$$C_{mv} = \{B(i, j)\}$$

where $$(B(i, j)) = \sqrt{x_{i,j}^2 + y_{i,j}^2},$$

where $(x_{i,j}, y_{i,j})$ is the motion vector associated with the (i,j)th block B. For the purpose of extracting the activity descriptor 100 in an MPEG video, the descriptor for a frame or object is constructed according to the following steps.

Activity Descriptor Extraction

Figure 2:
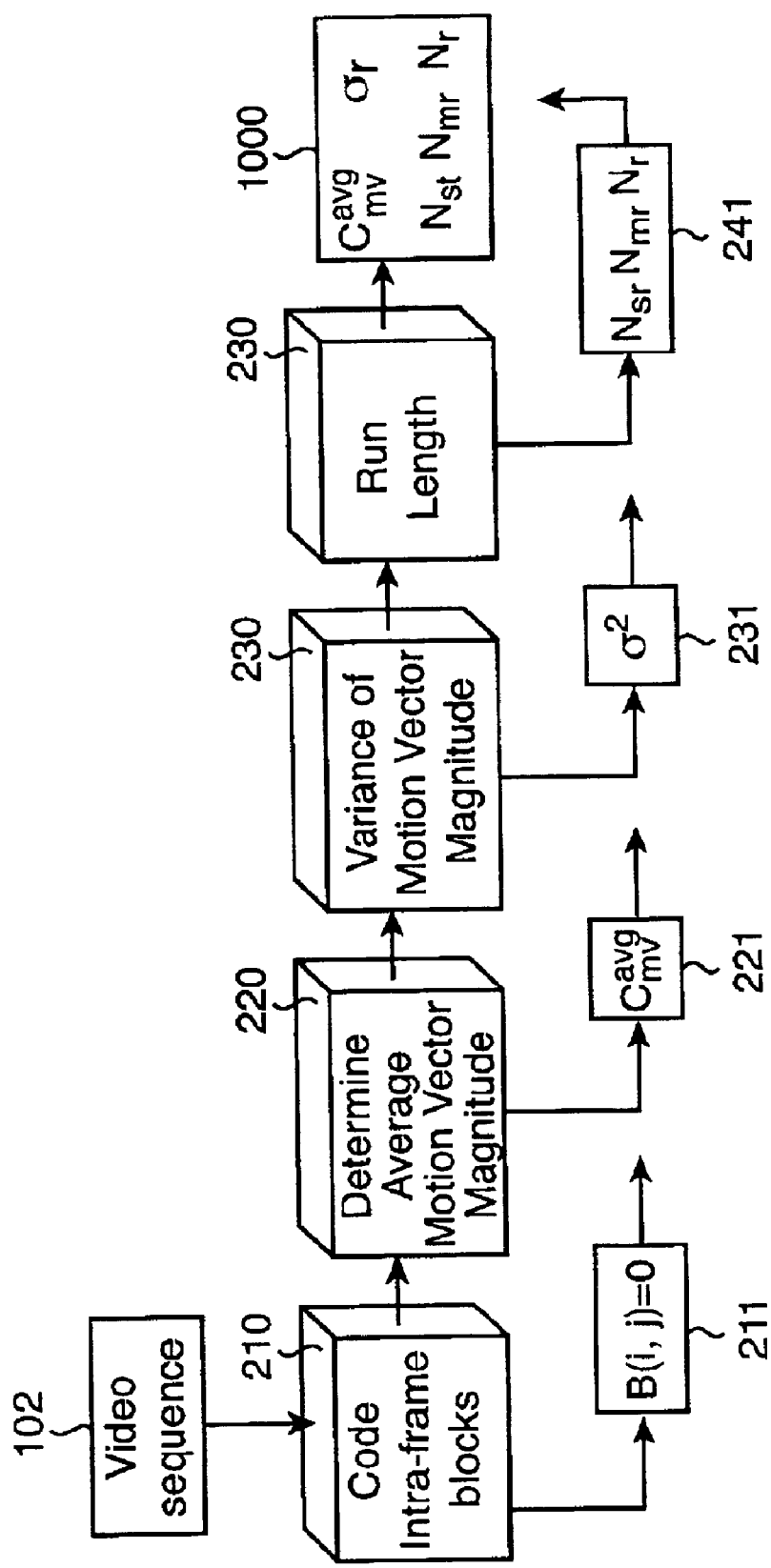
FIG. 2 is a flow diagram of a method for extracting the activity descriptor from the magnitudes of motion vectors of a frame.

FIG. 2 shows a method 200 for extracting activity attributes 100. In step 210, intra-coded blocks, B(i,j) 211 are set to zero. Step 220 determines the average motion vector magnitude $C_{mv}^{avg}$ 221, or "average motion complexity," for each block B of the frame/object as:

$$C_{mv}^{avg} = \frac{1}{MN} \sum_{i=0}^{M} \sum_{j=0}^{N} C_{mv}(i,j)$$

M = width in blocks

N = height in blocks.

Step 230 determines the variance $\sigma^2$ 231 of $C_{mv}^{avg}$ as:

$$\sigma_{fr}^2 = \frac{1}{MN} \sum_{i=0}^{M} \sum_{j=0}^{N} (C_{mv}(i,j) - C_{mv}^{avg})^2$$

M = width in blocks

N = height in blocks.

Step 240 determines the "run-length" parameters 241 of the motion vector activity matrix $C_{mv}$ by using the average as a threshold on the activity matrix as:

$$C_{mv}^{thresh}(i,j) = \begin{cases} C_{mv}(i,j), \text{ if } C_{mv}(i,j) \geq C_{mv}^{avg} \\ 0, \text{ otherwise.} \end{cases}$$

For the purpose of the following description, only the zero run-length parameters, in terms of a raster-scan length, are of interest.

We classify zero run-length parameters into three categories: short, medium and long. The zero run-length parameters are normalised with respect to the object/frame width. Short zero run-lengths are defined to be ⅓ of the frame width or less, medium zero run-lengths are greater than ⅓ of the frame width and less than ⅔ of the frame width. Long zero run-lengths are equal to or greater than the width of the frame, i.e., the run-length extends over several raster-scan lines in a row. For a further description of "zero run-lengths" see U.S. patent application Ser. No. 09/236,838 "Methods of Feature Extraction of Video," filed by Divakara et al. on Jan. 25, 1999, incorporated herein by reference.

In the notation below, we use the parameter $N_{sr}$ as the number of short zero run-lengths, and medium zero run-lengths, and long zero run-lengths are similarly defined with the parameters $N_{mr}$ and $N_{lr}$, respectively. The zero run-length parameters are quantitized to obtain some invariance with respect to rotation, translation, reflection, and the like.

Therefore, the activity parameters 100 for the frame/object include:

$C_{mv}^{avg}, \sigma_{fr}, N_{sr}, N_{mr}, N_{lr}$.

Zero Run-Lengths

As shown in FIGS. 3 and 4, the zero run-length parameters 241 can express the number, size, and shape of distinct moving objects in a frame and their distribution across the frame. In FIGS. 3 and 4, the horizontal lines generally indicate the raster-scan order. For a frame with a small or sparse number of large moving regions, e.g., a talking head 300, the number of relatively short run-lengths 301, when compared with the number of long run-lengths 302, is relatively high. Note there are only two long run-lengths, one at the top and one at the bottom of the frame. For a frame with several small objects 400, the number of short run-lengths 401 is relatively small when compared with the number of medium and long run lengths 402.

Unusual Event Detection

Figure 5:
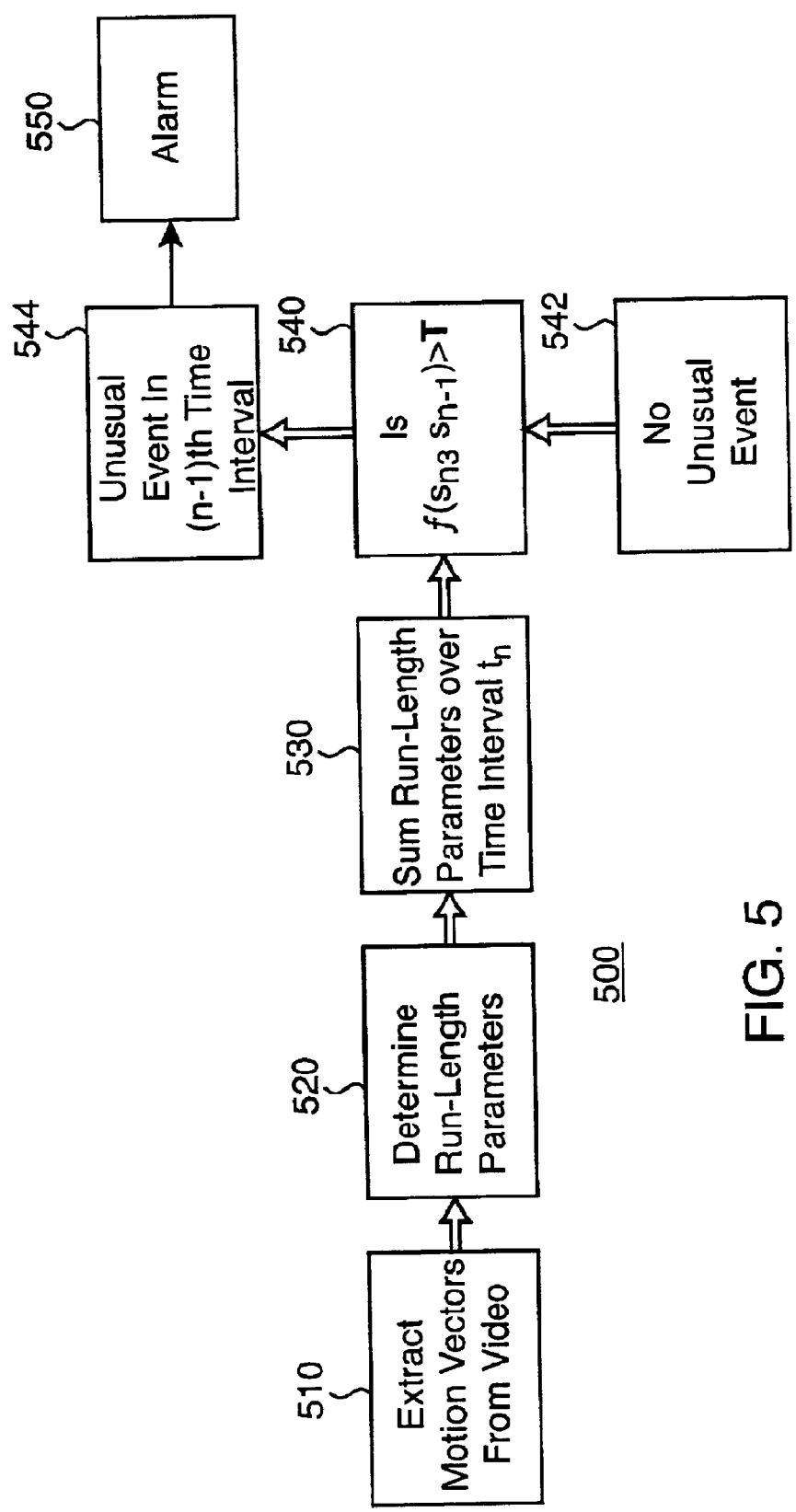
FIG. 5 is a flow diagram of a method for detecting unusual events in a video.

FIG. 5 shows a method 500 that uses the zero run-length parameters in each frame to detect unusual events. In step 510, the motion vectors are extracted from a sequence of the video. Step 520 determines the number of short, medium, and long zero run-lengths for each frame. Step 530 sums the run lengths parameters over each time interval $t_n$. For example, each time interval t is one minute, or 1800 frames, at thirty frames per second.

Step 540 determines a "distance" between the sums of the run-length parameters in a current time interval and a previous time interval. If this distance is greater than a predetermined threshold T, then an unusual event has occurred 544, and otherwise not 542. In the case of an unusual event, an alarm device 550 can be activated.

The distance metric is some function $f$ that operates on the run-lengths, i.e., $f(S_n, S_{n-1})$>T. In a simple example, only short run-lengths are considered, and the distance is the absolute difference of the short run-lengths sums, e.g., $|S_n(N_{sr}) - S_{n-1}(N_{sr})|$. Depending on the type of unusual event that is to be detected, different functions can be used. For example, consider only short and long zero run-lengths, and the distance is the difference of squares.

For example, a surveillance application, where a camera is observing an otherwise scene, e.g., an empty hallway, would consider any change in the sum of the run-lengths as an unusual event, i.e., the sudden entry of an intruder.

A traffic surveillance camera of a highway could similarly detect stalled traffic, perhaps due to an out-of-scene "downstream" accident, when the average number of moving objects over a time interval suddenly decreases. It should be noted here, that the unusual event, i.e., the down-stream accident, is inferred, and not, like prior art traffic surveillance applications, directly observed by the camera.

It should be noted, that the invention can detect unusual events in a real-time video, or it can process a video after the fact.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for detecting an unusual event in a video, comprising:

extracting motion vectors from each frame in a video;

determine zero run-length parameters for each frame from the motion vectors;

summing the zero run-length parameters over predetermined time intervals of the video;

determining a distance between the sum of the zero run-lengths of a current time interval and the sum of the zero run-lengths of a previous time interval;

signalling the unusual event if the distance is greater than a predetermined threshold.

2. The method of claim 1 wherein the zero run-length parameters are classified into short, medium and long zero run-lengths.

3. The method of claim 2 wherein the zero run-length parameters are normalized with respect to a width of each frame of the video.

4. The method of claim 2 wherein short zero run-lengths are defined to be one third the width of the frame or less, medium zero run-lengths are greater than one third and less than two thirds of the width of the frame, and long zero run-lengths are equal to or greater than the width of the frame.

5. The method of claim 1 wherein the zero run-length parameters express the number, size, and shape of distinct moving objects in the video.

6. The method of claim 2 wherein the distance is an absolute difference of the short run-lengths sums.

7. The method of claim 2 wherein the distance is a difference of squares of the short and long zero run-lengths.

8. The method of claim 1 wherein the video is of a scene without moving objects, and the unusual event is a moving object entering the scene in the video.

9. The method of claim 1 wherein the video is of a scene including vehicle traffic on a highway, and the unusual event is stalled traffic.

10. The method of claim 1 wherein the stalled traffic is due to an out-of-scene accident.

11. The method of claim 1 wherein the unusual event is inferred but not directly observed.

12. The method of claim 1 further comprising:

detecting the unusual event in a real-time video.

13. A system for detecting an unusual event in a video, comprising:

a camera acquiring a video of a scene;

means for extracting motion vectors from each frame in the video;

means for determine zero run-length parameters for each frame from the motion vectors;

means for summing the zero run-length parameters over predetermined time intervals of the video;

means for determining a distance between the sum of the zero run-lengths of a current time interval and the sum of the zero run-lengths of a previous time interval; and an alarm device for signalling the unusual event if the distance is greater than a predetermined threshold.

* * * * *